United States Patent
Kishi et al.

(10) Patent No.: US 6,502,165 B1
(45) Date of Patent: Dec. 31, 2002

(54) BALANCED ACCESS TO DATA VOLUMES WITH REDUNDANT COPIES STORED IN DATA STORAGE LIBRARIES

(75) Inventors: Gregory Tad Kishi, Oro Valley, AZ (US); Mark A. Reid, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,812

(22) Filed: Dec. 3, 1999

(51) Int. Cl.$^7$ .............................................. G06F 12/00
(52) U.S. Cl. ...................... 711/114; 711/113; 711/117; 711/167
(58) Field of Search ................................ 711/112, 113, 711/114, 117, 167

(56) References Cited

U.S. PATENT DOCUMENTS

| | | | |
|---|---|---|---|
| 5,212,772 A | 5/1993 | Masters | 395/200 |
| 5,673,381 A | 9/1997 | Huai et al. | 395/180 |
| 5,870,732 A | 2/1999 | Fisher et al. | 707/1 |
| 5,911,148 A | 6/1999 | Anglin et al. | 711/111 |
| 5,949,954 A | 9/1999 | Young et al. | 386/83 |
| 6,385,672 B1 * | 5/2002 | Wang et al. | |

OTHER PUBLICATIONS

"The RAID Book," 6th edition, by Paul Massiglia, 1997, The RAID Advisory Board.*

* cited by examiner

*Primary Examiner*—Matthew Kim
*Assistant Examiner*—Christian P. Chace
(74) *Attorney, Agent, or Firm*—John H. Holcombe

(57) ABSTRACT

A data storage library system with a plurality of data storage libraries and at least one director accesses a redundant copy of an identifiable data volume, employing the idle time status of each library to balance the workload. The data volumes may be stored in cache storage and backing storage which have different levels of access speed. A director requests a data volume, and the library controller of each library determines its current idle time status, providing the idle time status to the requesting director when it provides a synchronization token directly associated with the requested data volume. The token indicates the update level and the access level of the data volume in the library. The director, upon determining from the tokens that at least two of the copies of the data volume are at the same fastest available access level, compares the provided idle time status of the libraries storing those copies, and accesses the data volume from the library having the greater idle time status.

34 Claims, 6 Drawing Sheets

BALANCED ACCESS TO DATA VOLUMES WITH REDUNDANT COPIES STORED IN DATA STORAGE LIBRARIES

DOCUMENTS INCORPORATED BY REFERENCE

Commonly assigned U.S. patent application Ser. No. 09/283,223 K. F. Day III et al. is incorporated for its showing of a data storage library system having directors for storing and tracking multiple copies of data in system data storage libraries.

Commonly assigned U.S. patent application Ser. No. 09/391,186, T. W. Bish et al., is incorporated for its showing of a data storage library system for tracking and accessing data volumes from multiple data storage libraries having cache storage and backing storage.

FIELD OF THE INVENTION

This invention relates to storage of redundant copies of data volumes in a plurality of data storage libraries which have storage with different levels of access speed to the data volumes, such as cache storage and backing storage, and, more particularly, to accessing copies of data volumes from the data storage libraries.

BACKGROUND OF THE INVENTION

Data processing systems comprising at least one host typically require a large amount of data storage. If the data, typically stored as a data volume, is not immediately required by the hosts, for example, if the data volume is infrequently accessed, the storage of the data volume may be on removable rewritable data storage media, such as magnetic tape or optical disk, and the data volumes may be written and or read by means of a data storage drive.

The data storage drive is typically coupled to the host, or processing unit, by means of a peripheral interface in which commands are directed only from the processing unit to the data storage drive, and the data storage drive responds to those commands, performing the commanded functions. No commands can be sent by the data storage drive to the coupled processing unit. Typically, the commands are performed by a device controller.

If a large amount of data is to be stored and accessed on occasion, data storage libraries are employed. Such data storage libraries provide efficient access to large quantities of data volumes stored in a backing storage of removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise one or more processors or which may comprise the same processor as the robot controller, typically tracks each data volume and the data storage media on which it is stored, and tracks the storage shelf location of each data storage media.

Herein, a library manager, either with or without the robot controller, is defined as a "controller" or a "library controller" for the data storage library.

If the data storage media, subsequent to being accessed, may be reaccessed, it is advantageous to employ data storage libraries having both cache storage and backing storage. The data storage library will access the data volume of the removable media from the backing storage and will temporarily store the data volume in the cache storage so that it can be immediately reaccessed. The removable media may then be returned to a storage shelf, and the data volume updated while it is in cache storage without the need to reaccess the removable media. The cache storage is typically limited in capacity, requiring that the data volumes be migrated to backing storage so as to free space in the cache storage. Typically, a least recently used (LRU) algorithm is employed to migrate data volumes out of cache storage to backing storage.

It is also desirable to provide a level of redundancy of the data to provide constant access to data volumes, even should a data storage library or a communication path to a data storage library be unavailable.

An example of a data storage library system for redundantly storing and accessing data volumes stored on removable data storage media in a plurality of data storage libraries is described in the incorporated coassigned K. F. Day III et al. application. The library controller of each library provides an updatable synchronization token directly associated with each data volume. A plurality of directors are provided, each separate from and coupled to the hosts and each separate from and coupled to each data storage library. Each director responds to separate, partitioned data storage drive addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. In most data processing applications, it is critical to access the most current data. Hence, the currency of the data volumes are each tracked by means of the directly associated synchronization token, and the synchronization token is not tracked by the host.

The time to access a data volume in the cache storage may be faster than the time to access a data volume in the backing storage by at least an order of magnitude. This is because access to data volumes in cache storage is accomplished at electronic speeds, or at speeds of hard disk drives, while the robot must fetch the data storage media containing the data volume from its storage shelf, and move the data storage to a data storage drive, then load the data storage media and locate the requested data volume. It is thus advantageous to access data volumes in cache storage, a "cache hit" rather than to have to wait for the extra time to access data volumes in the backing storage, a "cache miss".

In the incorporated K. F. Day III et al. application, the director responds to a recall request for an identifiable data volume by requesting all of the synchronization tokens from the coupled data storage libraries pertaining to that data volume. The director employs the synchronization token to determine a currently updated synchronization token for the identifiable data volume, and accesses the identifiable data volume at the data storage library having a currently updated synchronization token. In the incorporated coassigned T. W. Bish et al. application, if more than one data storage library has the most current synchronization token, the copy of the data volume stored in cache storage of a library is accessed rather than the copy stored in the backing storage of the other library.

If the synchronization tokens indicate that two copies are the most current, and both copies are stored in cache storage and at the same access level of cache storage, the incorporated Bish et al. application employs a "normal" algorithm to select the library for accessing the data volume, such as a rotating round robin basis.

However, such "normal" algorithms may result in attempting to access the data from a data storage library that is fully occupied handling existing jobs, such that the relative job load between the libraries is unbalanced.

SUMMARY OF THE INVENTION

An object of the present invention is to select the data storage library to access a redundant copy of an identifiable data volume so as to balance the workload between the data storage libraries.

A data storage library system with a plurality of automated data storage libraries, and at least one host or director, accesses a redundant copy of an identifiable data volume employing a method, which may be computer implemented, that utilizes the idle time status of each library to balance the workload.

Each data storage library has a library controller, and at least two access levels of storing and accessing the identifiable data volumes at different access speeds. The access levels may be a cache storage which operates at electronic speeds, and a backing storage such as tape cartridges which must be accessed from storage shelves at mechanical speeds. The library controller provides a synchronization token directly associated with each data volume which identifies the update level of the data volume. Additionally, the token provides a flag which indicates the access level of the identifiable data volume in the data storage library.

A director requests a data volume, and the library controller of each library determines its current idle time status and provides the encoded idle time status to a requesting director when it provides the synchronization token directly associated with the requested data volume.

The director reads the synchronization tokens directly associated with the data volume from the data storage libraries; the director determining from the read tokens whether a plurality of the redundant copies of the data volume are at the most current update level and at the same access level and none of the copies of the data volume is at a faster access level, such that the copies of the data volume are stored in the data storage libraries at the same fastest available access level.

The director, upon the determination indicating that at least two of the copies of the data volume are at the same fastest available access level, compares the provided idle time status of the data storage libraries storing those copies, and indicates which library provides the greater idle time status. The director then accesses the data volume from the indicated data storage library.

The idle time status may comprise the percentage of available operating time that the library is idle, and may be a combination of the percentage of available operating time the library is idle and the percentage of available operating time the library is in I/O wait state, or other indicators relating to the loading of the library.

For a fuller understanding of the present invention, reference should be made to the following detailed description taken in conjunction with the accompanying drawings.

BRIEF DESCRIPTION OF THE DRAWINGS

FIG. 10 is a flow chart depicting a method in accordance with an embodiment of the present invention for providing idle time status employed with the data storage library of FIG. 2.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
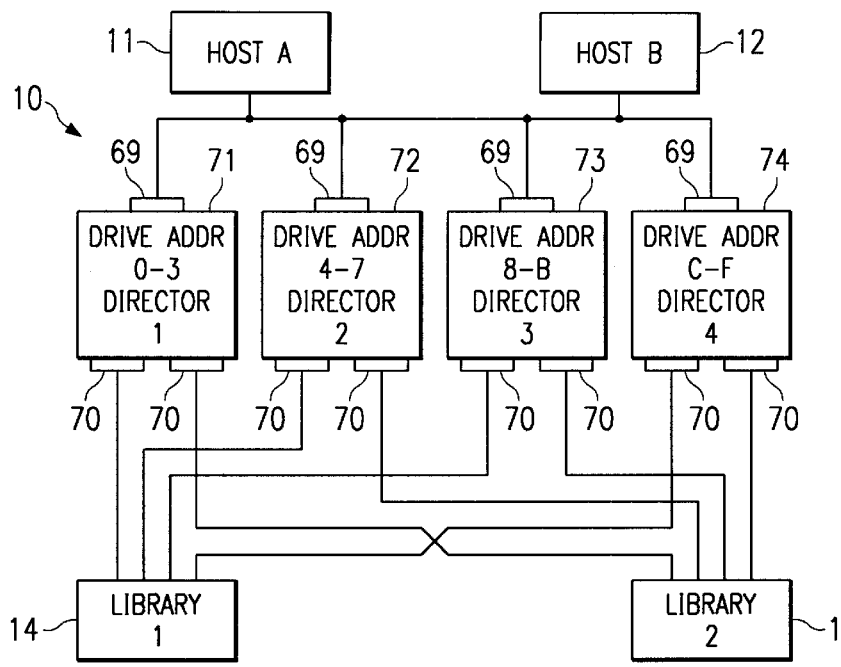
FIG. 1 is a block diagram showing interconnection of functional components of a data storage library subsystem employed in accordance with an embodiment of the present invention.

Referring to FIG. 1, an embodiment of a data storage library subsystem 10 is illustrated which redundantly couples host systems 11 and 12 to data storage libraries 14 and 15, via a plurality of directors 71–74, in accordance with the incorporated Day III et al. application. The Day III et al. application provides the directors for storing and tracking multiple copies of data in the data storage libraries. The tracking is accomplished by providing each redundant copy of the data volume with a directly associated synchronization token. Each director 71–74 communicates with a host over an interface 69 and with a library 14 or 15 over an interface 70.

The host systems 11 and 12 are coupled to and employ the data storage library subsystem 10 for storing data, typically stored as a data volume, which is not immediately required by the hosts, for example, if the data volume is infrequently accessed. However, when the data is required, the data volumes may be accessed numerous times and continually updated. Thus, referring additionally to FIG. 2, each data storage library comprises a "virtual" library which includes a non-volatile cache storage, such as a disk drive 40, or an electronic memory 39, for maintaining the data volumes that have been recently accessed, and includes a backing storage, such as removable data storage media having data volumes 18, for storing data volumes for infrequent access.

Data volumes are provided to the library from a host and director, and the host waits until the virtual library writes the data volume to non-volatile cache before providing a "return" signal to the host.

In the incorporated Bish et al. application, cache storage is made available by migrating all but one of the redundant copies of the data volume to backing storage on a high priority basis. The cache storage is accessible at relatively fast electronic or near electronic speeds, while the backing storage is accessible at much slower mechanical speeds. Thus, in accordance with the incorporated Bish et al. application, if one of the most currently updated copies is in cache storage and another is in backing storage, the copy in cache storage is accessed. Further, the cache storage may have two access speeds, and the most current data volume that is in the fastest access level is accessed.

The present invention balances the workload between the libraries if all the most currently updated copies of the data volume are at the same access level, or at least two of the most currently updated copies are at the fastest available access level.

The host systems 11 and 12 may be embodied by a variety of types and numbers of processing units, servers, or computing systems. The data storage libraries 14 and 15 may comprise any similar libraries for storing removable rewritable data storage media, such as magnetic tape cartridges or optical disks. An example of a suitable data storage library is the IBM 3494 Virtual Tape Server. More than two data storage libraries 14–15 may be provided, each storing one of the redundant copies of each of the redundant data volumes.

Figure 2:
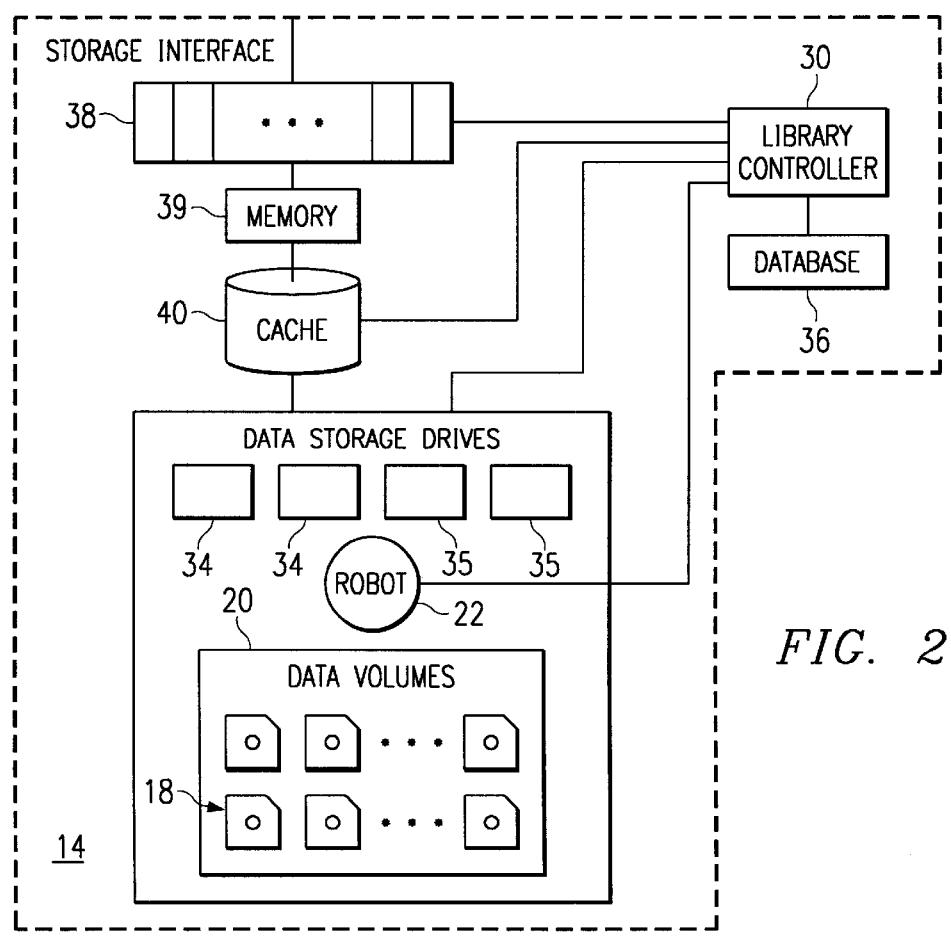
FIG. 2 is a block diagram showing functional components of an example of a data storage library of FIG. 1 employed in accordance with an embodiment of the present invention.

Referring to FIG. 2, the removable data storage media is stored in storage shelves 20 which are accessed by at least one robot 22 under the control of a library controller 30. The removable data storage media in storage shelves 20 containing the data volumes 18 comprise a backing storage. A plurality of data storage drives 34 and 35 allow access to read and/or write data volumes 18. The data storage library is a "virtual" library with non-volatile cache 39 and 40 coupled to the data storage drives 34 and 35. Cache storage 39 may comprise an electronic memory with non-volatile capability, such as a "flash" memory, or memory with a battery for back up power, and cache storage 40 may comprise one or more magnetic disk drives. The library controller 30 may comprise a library manager which utilizes a data base 36 to track each data volume and the data storage media on which it is stored, to track the storage shelf location 20 of each data storage media, and to track each data volume in non-volatile fast cache 39 and non-volatile cache 40.

The data base 36 and non-volatile cache 40 may comprise the same or different magnetic disk drives.

Communication with the library is conducted at a storage interface 38 to the library controller 30, the non-volatile fast cache 39, and to the addressed drives 34 and 35. The addressed drives 34 and 35 may either accommodate different media and/or operate at different speeds. For example, data storage drives 34 may comprise optical disk drives for data volumes 18 stored on optical disk, and offer faster access to data volumes by means of random access seeks to any track, while data storage drives 35 may comprise tape drives for data volumes 18 stored on magnetic tape cartridges, which provide linear access to the data volumes. Alternatively, both data storage drives 34 and 35 may comprise tape drives, but data storage drives 34 may be higher cost and offer higher speed access to the data volumes, or data storage drives 34 may be associated with data storage media having less data capacity, but with faster access to data volumes. An example would be media that is shorter in length.

Referring to FIGS. 1 and 2, directors 71–74 are illustrated as separate from the libraries, however, one or more of the directors may be physically located in a library 14 or 15, and may comprise a separate board at, or may be a part of, a library controller 30. Additionally, a physical library may be partitioned, each partition treated as a separate library, with separately partitioned storage shelves 20, non-volatile cache 39 and 40, database 36 and data storage drives 34 and 35, while sharing the robot or robots 22. The library controller 30 may comprise one or more processors and would track the data volumes separately and share control of the operation of the robot.

If a data volume is in the backing storage 20, and a command is received to access the data volume, the library controller 30 identifies the data storage media and the storage shelf 20 containing the data volume. The library controller then operates the robot 22 to access the data storage media from the storage shelf 20 and to deliver the data storage media to a drive 34 or 35. When the data storage media containing the identified data volume 18 is delivered to the drive, and physically mounted on the drive and the data volume is accessed, the library controller 30 provides a "ready" signal at the storage interface 38. The data volume is then typically read into cache 40 or 39 and read and/or written by the addressing host via data transfer at the storage interface 38.

In accordance with the present invention, cache storage is defined either as a single cache storage 40 or as multiple access levels of cache storage, including fast cache storage 39 and cache storage 40.

Once a data volume is in cache storage 39 or 40, it may be quickly accessed, or a received data volume may be quickly transferred to the library cache storage without waiting for the data storage media to be loaded. Since the cache storage is non-volatile, the data volume is retained in storage. The library controller 30 may cause the cache storage to appear to the director and host as though it is a number of drives with mounted media. The cache storage is thus a number of "virtual drives".

The cache storage 39 and 40 is limited in capacity as compared to the vast number of data volumes 18 that can be stored in the backing storage. Thus, data volumes in cache storage 39 and 40 must continually be migrated out of cache storage to the backing storage. Cache storage 39 additionally is limited in capacity to the cache storage 40. The migration may be from cache storage 39 to cache storage 40, as an initial migration, and subsequently from cache storage 40, to backing storage 20. Alternatively, the data volume may initially be stored in cache storage 39 or in cache storage 40 and directly migrated to backing storage 20. As a data volume is migrated, the portion of cache storage previously occupied by the migrated data volume is "freed", becoming available for storing another needed data volume.

The migration from cache storage to backing storage 20 may be directly to either drives 34 or to drives 35, or migration may continue in backing storage, with the data first migrated to backing storage at one of drives 34 and then migrated to another part of the backing storage at one of drives 35.

Figures 3, 4A, 4B, 5:
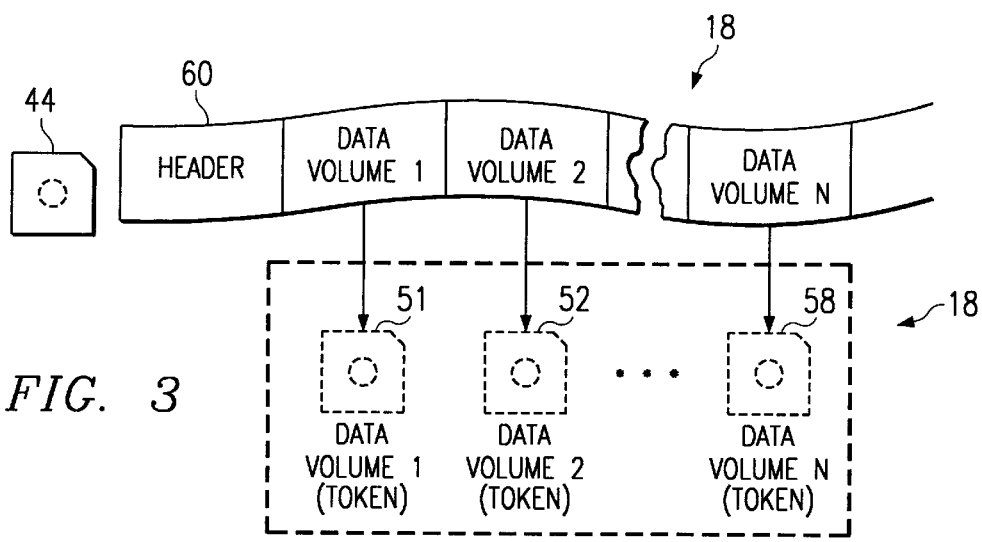
FIG. 3 is a generalized diagram of logical data volumes stored on a single physical volume for use in a data storage library of FIGS. 1 and 2.
FIGS. 4A and 4B are diagrammatic representations of tables relating data volumes to synchronization tokens directly associated with the data volumes, and for attaching indicators which indicate whether the data volume is stored in cache storage or backing storage.
FIG. 5 is a representation of the codes for flag indicators which represent storage levels of data storage volumes in cache storage or backing storage.

Typically, in removable data storage systems, a plurality of data volumes 18 are stored on a single physical data storage media, called a physical volume. FIG. 3 is a schematic representation of a physical volume 44, such as a magnetic tape in a cartridge, which contains N logical volumes, thereby replacing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

A new physical volume is called a "SCRATCH" volume, and the logical volumes 51, etc., will be defined as they are written. A logical volume may be recalled and updated, and is rewritten, typically at a new location or a different location on the same or a different physical volume. The original location of the recalled logical volume is also a "SCRATCH" volume. On occasion, the library controller will reclaim a physical volume by reading all of the non-SCRATCH logical volumes into cache storage and rewriting them onto another physical volume without updating, leaving the first physical volume as a "SCRATCH" volume which may be entirely rewritten.

The library controller 30 typically maintains a portion of cache 39 and/or 40 available as "SCRATCH" logical volumes so that updated or new logical volumes may be written at electronic speeds when a write is requested by a host.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes an index or a volume table of contents (VTOC) 60 which identifies each of the data volumes 51–58 stored on the physical volume. A "SCRATCH" physical volume is also identified by a VOLSER.

In accordance with the incorporated Day III et al. application, the library controller 30 provides a synchronization token directly associated with each data volume, the synchronization token comprising an updatable token. Referring to FIGS. 2 and 3, the synchronization tokens may be directly associated with data volumes 18 by storing the tokens in the data base 36, alternatively storing the tokens with each physical volume 44, or still alternatively storing the tokens directly with each data volume 51–58.

Referring to FIGS. 1 and 2, a plurality of directors 71–74 are provided, each separate from and coupled to the hosts 11–12 and each separate from and coupled to each data storage library 14–15. Each director responds to ones of separate, partitioned access addresses such as data storage drive addresses, addressed by the hosts with the supplied command. For example, director 71 responds to drive addresses 0–3, director 72 responds to drive addresses 4–7, director 73 responds to drive addresses 8-B, and director 74 responds to drive addresses C–F. The library controller 30 of each data storage library 14–15 provides an updatable synchronization token directly associated with each data volume. The responding director 71–74 supplies each data volume supplied from a host to all of the data storage libraries, and updates each synchronization token directly associated with the supplied data volume. Thus, the libraries 14–15 store duplicate copies of the data volume. The currency of the data volumes are each tracked by means of the directly associated synchronization token, and the synchronization token is not tracked by the host nor is a central tracking data base required. If a data volume is updated at a library, a director increments the synchronization token and supplies the updated synchronization token to the library to directly associate the synchronization token with the data volume to track the update level of the data volume. As each of the redundant copies is updated, the directly associated synchronization token is also updated, so that the currency of each of the redundant copies of the data volume is tracked by the synchronization tokens.

The library controller 30 comprises at least one programmable computer processor, such as an IBM RS-6000 processor, and is provided with an operating system and application programs for operating in accordance with the present invention. The application programs may comprise a computer program product, comprising computer readable program code. The computer program product may be supplied electronically, as from a network or one of the hosts 11–12 at communications interface 38, via a director. Alternatively, the computer program product may be supplied at an I/O station of the processor or from a storage media which stores executable computer instructions, and comprises an article of manufacture, such as data storage media 44 in FIG. 3. Another example of a storage media which is an article of manufacture is a magnetic diskette. Other suitable storage media are optical disks, magnetic tape cartridges, removable hard disk cartridges, read only memories (ROM) or programmable read only memories (PROM). The requirement for the storage media or memories is that they store digital representations of computer executable instructions. The operating system and application programs may be stored in the data base 36.

The data storage libraries may have different arrangements of the shelves and different numbers of drives, and may migrate different ones of the redundant copies of the data volumes at different rates, so that the content of the cache storage 39–40 for each of the libraries 14–15 may be different at any one time. However, a data volume is typically accessed repeatedly in a short time while a processing job is being conducted, and upon completion of the job, the data volume is not accessed for a considerable period of time. If the data volume is updated during the job, the data volume is likely to be maintained in cache storage 39–40 of both libraries throughout the period the job is being processed.

The present invention increases the performance of the plurality of data storage libraries 14–15 which store redundant copies of the data volumes by balancing the workloads of the libraries.

In accordance with the present invention, each of the data storage libraries 14–15 maintains the synchronization token directly associated with the data volume. The library controller 30 of each data storage library identifies each of the data volumes currently stored in the cache storage 39 and/or 40 of the data storage library, and identifies each of the data volumes currently stored in the backing storage 20 of the data storage library.

The directors 71–74 receive recall requests from the hosts 11–12 for data volumes stored in the data storage libraries. As discussed above, the directors forward the commands to the libraries. A director, in forwarding a recall request, requests the directly associated synchronization token from each library. Then, each data storage library responds to a recall request for one of the redundant copies of the identifiable data volumes, providing the synchronization token directly associated with the identifiable data volume, and an indicator, from the identifying steps, which indicates whether the identifiable data volume is identified as currently stored in the cache storage 39–40 or the backing storage 20. As an example, the indicator may comprise a flag attached to the synchronization token. Thus, the performance of the accessing is increased by a selection of a redundant copy of the identifiable data volume identified as stored in the cache storage rather than a copy identified as stored in the backing storage.

Referring additionally to FIGS. 4A and 4B, one embodiment of an indicator is a "flag" 67, which is one or more bits in a specific location in a table. Tables 61 and 62 are illustrated for each of two libraries, library "1" and library "2", such as libraries 14 and 15. Each table is preferably in the data base 36 of the library. Each table relates the data volume (e.g., VOLSER) 65 to the directly associated synchronization token 66, thereby maintaining and storing the synchronization token. The flag 67, also called a "cache" flag, is attached to the synchronization token for the directly associated data volume. Thus, the cache flag indicates whether the data volume is currently stored in cache storage 39–40, a "1", or in backing storage 20, a "0". Herein, a "cache" flag may indicate that a data volume is in cache storage or backing storage, also called a "backing storage" flag.

Using the examples of tables 61 and 62, the synchronization tokens 66 are different for data volume "0001", thus, in accordance with the incorporated Day III et al. application, the library having the data volume with the most current synchronization token, library "1", will be selected for providing the data volume, and the attached cache flags 67 will not be considered. The reverse is true for data volume "0002", with library "2" having the most current synchronization token.

With respect to data volume "0003", the synchronization tokens are identical. This will be the normal case when the libraries are functioning normally. Thus, the requesting director 71–74 will select the data volume which is in cache storage as indicated by the cache flag "1" 67 for library "1" rather than the data volume which is in backing storage as indicated by the cache flag "0" 67 for library "2".

FIG. 5 illustrates alternative indicators, comprising a binary code 90 for cache flags. As illustrated, fast cache 39 is indicated by the code "11", the other cache 40 is indicated by the code "10", backing storage (1) 20 accessible by drives 34 is indicated by the code "01", and backing storage (2) 20 accessible by drives 35 is indicated by the code "00".

As an alternative, backing storage (1), code "01", may represent data volumes presently at a drive 34–35, and backing storage (2), "00", may represent data volumes in the storage shelves 20. Still alternatively, backing storage (1) may additionally comprise data volumes being transported by a robot 22.

Figure 6:
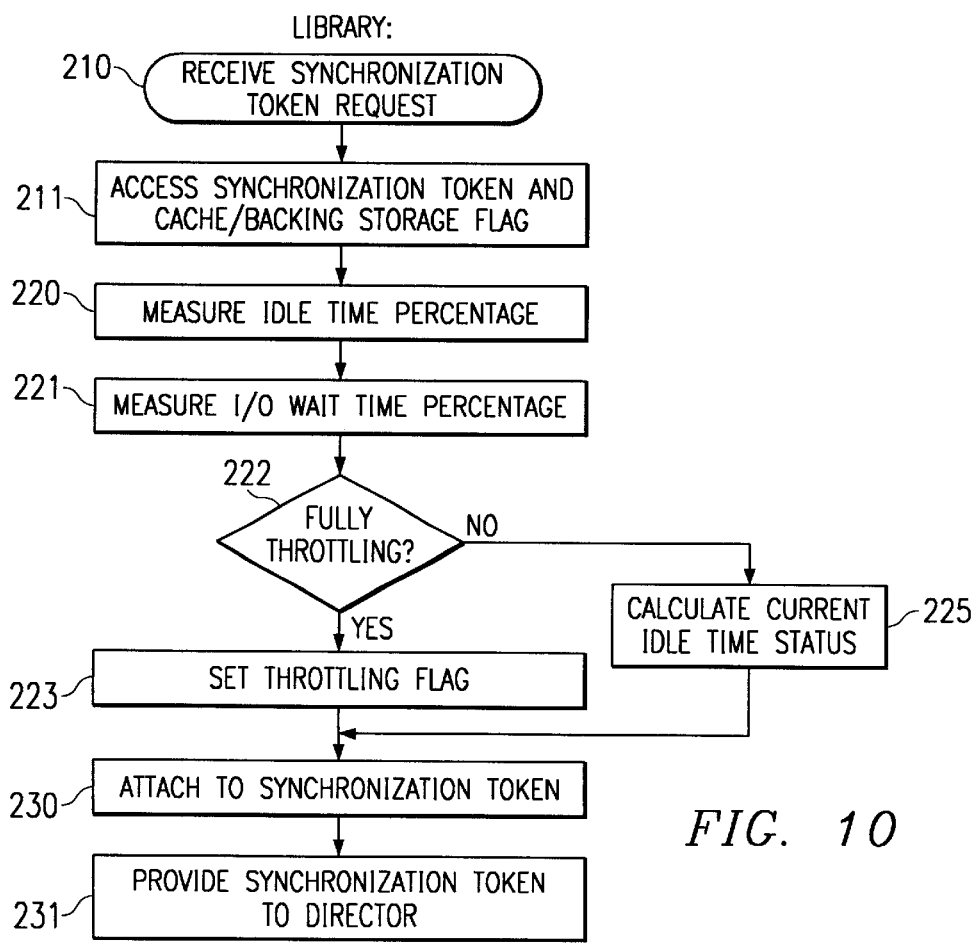
FIGS. 6A and 6B are diagrammatic representations of tables relating data volumes to synchronization tokens directly associated with the data volumes, and for attaching indicators, such as those of FIG. 5, which indicate the storage level of the data volume in cache storage or backing storage.

FIGS. 6A and 6B illustrate the cache flags 68 employing the codes 90 of the table of FIG. 5. The cache flags 68 are bits in a specific location in a table in each library. Tables 61 and 62 are again illustrated for libraries "1" and "2", such as libraries 14 and 15. Again, each table is preferably in the data base 36 of the library. Each table relates the data volume (e.g., VOLSER) 65 to the directly associated synchronization token 66, thereby maintaining and storing the synchronization token. The cache flag 68 may be attached to the synchronization token for the directly associated data volume. Thus, the cache flag indicates whether the data volume is currently stored in fast cache storage 39, a "11", other cache 40, a "10", or in backing storage 20, a "01" for backing storage (1) and "00" for backing storage (2).

Using the examples of tables 61 and 62, the synchronization tokens 66 are identical for the illustrated data volumes, which is the typical situation when the libraries are operating normally. Thus, the libraries supply the cache flag indicators attached to the synchronization tokens for the data volume. Then, the library having the data volume with the highest level flag, indicating that the data volume is in storage which provides faster access to the data will be selected.

For example, the cache flag for data volume "0001" in library "1" is "11" indicating that the data volume is in fast cache 39, while the flag is "10" in library "2" indicating that the data volume is in the other cache 40. Thus, the director will select library "1". The cache flag for data volume "0002" is "10" in library "1" and "01" in library "2", meaning that the data volume is in cache storage 40 in library "1" and in backing storage in library "2". Hence, the data volume will be selected from the library having the data volume in cache storage, library "1".

With respect to data volume "0003", the synchronization tokens are identical, and the cache flags indicate that both libraries are storing the data volume in backing storage. In accordance with the present invention, the requesting director 71–74 will select the data volume which is in backing storage (1), flag "01" for library "1", rather than the data volume which is in backing storage (2) as indicated by the cache flag "00" 68 for library "2".

Figure 7:
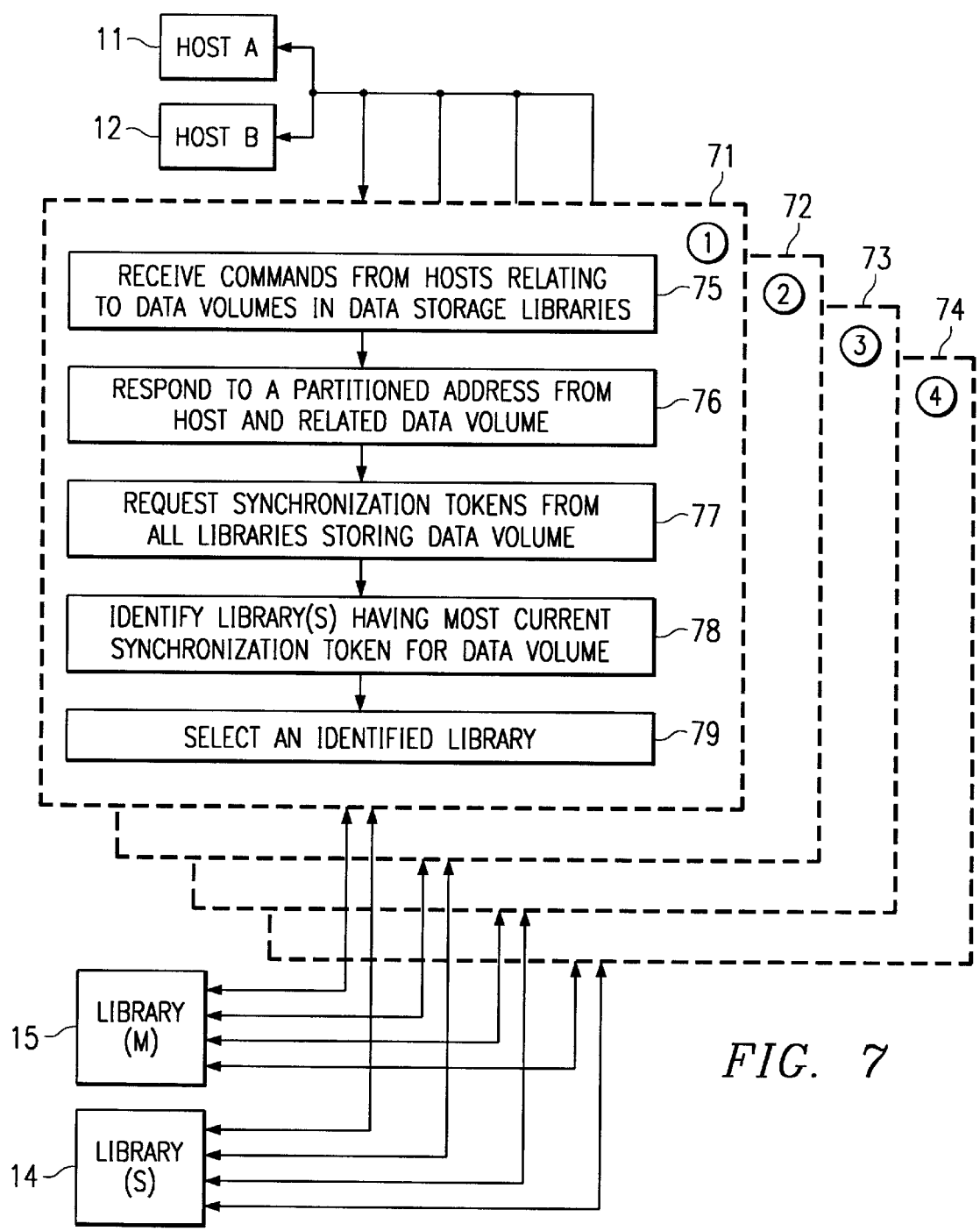
FIG. 7 is a flow chart depicting a generalized embodiment of a method of the data storage library subsystem of FIG. 1 employed in accordance with an embodiment of the present invention.

FIG. 7 is based upon the incorporated Day III et al. application, and as discussed therein, referring additionally to FIG. 1, the hosts 11–12 address the directors by access addresses, which may comprise data storage drive addresses, supply the data volumes to be stored, and receive the accessed data volumes. The directors, in step 75, receive commands from the hosts 11–12 relating to identifiable data volumes, and are separate from the hosts and separate from each of the data storage libraries 14–15. In step 76, the directors respond to ones of separately partitioned separated access addresses addressed by the hosts and to any accompanying data volumes. In step 77, the director which responds to a partitioned access address and to a data volume recall request, first requests synchronization tokens from all of the data storage libraries storing the data volume. Then, in step 78, the director examines the synchronization tokens received from the libraries, and identifies the library(s) having the most current synchronization token for the data volume. Lastly, in step 79, the director selects an identified library.

In the instance that a write is requested by a host, requiring only a "SCRATCH" volume, the volume will be available in cache storage at all of the data storage libraries. Thus, steps 77 and 78 will be skipped, or step 79 will be skipped and step 78 will treat all "SCRATCH" volumes as though they have the most current synchronization token.

The present invention may be employed with a single host or server, performing the function of only a single director.

Hence, herein "director" may refer to the directors 71–74 or to a host 11 or 12 performing the function of a director selecting an identified library to access a requested data volume.

In accordance with the present invention, should mote than one library have the most current synchronization token directly associated with the data volume, and should more than one be stored in the fastest access level storage, the director selects one of the libraries based upon the relative workload availabilities of the libraries. In accordance with the present invention, the indicators of the relative workload availabilities is determined by the libraries and may be attached to the synchronization token.

Figures 8, 9:
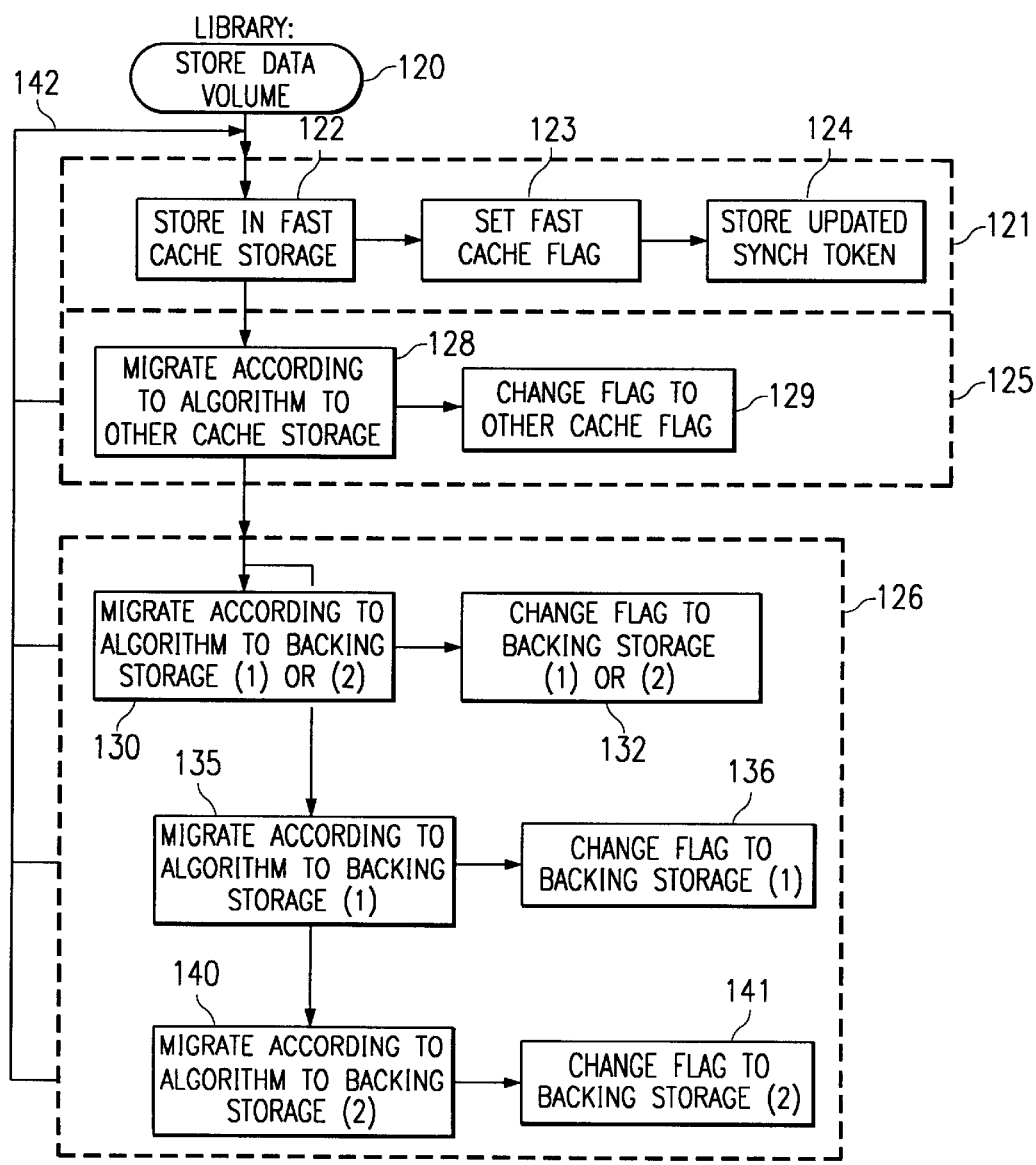
FIG. 8 is a diagrammatic representation of a synchronization token with an attached idle time status in accordance with an embodiment of the present invention.
FIG. 9 is a flow chart depicting alternative methods of migrating data volumes and attaching flag indicators to the synchronization tokens.

Referring to FIG. 8, one embodiment of the present invention is illustrated, employing the idle time status 200 of each library to balance the workload. As illustrated in FIG. 8, the idle time status is provided to the director by the library by attaching the encoded idle time status to the synchronization token 201. The synchronization token, as discussed in the incorporated Bish et al. application, comprises the identification of the directly associated data volume 204, the identification of the library 205 that is storing the directly associated data volume, the update level of the data volume 206, and the cache flag 207 which indicates the access level of the stored data volume. Alternatively, the idle time status may be communicated to the director separately from the synchronization token in a separate communication, which would be less efficient.

Referring additionally to FIGS. 1, 2 and 7, a director 71–74 requests a data volume, and the library controller 30 of each library determines its current idle time status 200 and provides the encoded idle time status to the requesting director when it provides the synchronization token 201 directly associated with the requested data volume.

The director 71–74 reads the synchronization tokens directly associated with the data volume from the data storage libraries 14–15; the director determining from the read tokens whether a plurality of the redundant copies of the data volume are at the most current update level and at the same access level and none of the copies of the data volume is at a faster access level, such that the copies of the data volume are stored in the data storage libraries at the same fastest available access level. This includes "SCRATCH" volumes at the same fastest available access level.

The director 71–74, upon the determination indicating that at least two of the copies of the data volume are at the same fastest available access level, compares the provided idle time status of the data storage libraries storing those copies, and indicates which library provides the greater idle time status. The director then accesses the data volume from the indicated data storage library.

The idle time status may comprise any indicator or combination of indicators relating to the loading of the library. Examples of idle time status comprise the percentage of available operating time that the library is idle, may be a combination of the percentage of available operating time the library is idle and the percentage of available operating time the library is in I/O wait state, and/or may comprise an indication that the library is "throttling", as will be discussed.

FIG. 9 illustrates an example of the migration of data volumes and attachment of the flag indicators to the synchronization tokens in accordance with the incorporated Bish et al. application. The storage process begins at step 120 with the receipt of the data volume from a director 71–74.

Referring additionally to FIGS. 1, 2, 6A, 6B and 8, the library controller 30, in step 122, stores the data volume in fast cache storage 39, and stores the updated synchronization token 66 directly associated with the data volume in table 61 or 62 of data base 36 in step 123. Then, in step 124, the library controller sets the indicator 68 to a fast cache flag, such as flag "11", in table 61 or 62 attached to the synchronization token.

Subsequently, if the data volume is not recalled or accessed, an algorithm of the library controller 30 dictates the migration of the data volume. Thus, in step 128, the library controller migrates the data volume from fast cache 39 to the other cache 40, and, in step 129, changes the flag 68 in table 61 or 62 to the other cache flag, e.g., "10". The migration algorithm employed is a matter of choice as understood by those of skill in the art.

Subsequently, if the data volume is not recalled, the library controller migrates the data volume from cache storage 39–40 to backing storage 20. In one embodiment, step 130 migrates the data volume according to an algorithm to either backing storage (1) or backing storage (2). Examples of such algorithms are understood by those of skill in the art, and may directly assign the data volume to the backing storage in which other data volumes having a common affinity are stored, or assign the data volume to the backing storage most closely associated with the likely future recall of the data volume. In step 132, the cache flag 68 in table 61 or 62 is changed from a cache storage flag, such as the other cache flag, "10" to the backing storage cache flag, e.g., a "01" for backing storage (1) or a "00" for backing storage (2) by library controller 30.

Alternatively, the data volume is first migrated, in step 135, according to an algorithm to backing storage (1). Upon conducting the migration, the library controller 30, in step 136, changes the flag from a cache storage flag to the flag indicating backing storage (1), e.g., "01", in table 61 or 62. At a subsequent time, again if the data volume is not recalled or accessed, the library controller 30 further migrates the data volume according to an algorithm, in step 140, from backing storage (1) to backing storage (2), and, in step 141, changes the flag 68 in table 61 or 62 from indicating backing storage (1) to indicating backing storage (2), e.g., "00".

Then, when a director requests a data volume, the library controller 30 of each library controller 30 attaches the flag 67 of table 61 or 62 of FIG. 4A or 4B, or attaches the flag 68 of table 61 or 62 of FIG. 6A or 6B, to the synchronization token 201 of FIG. 8, shown as flag 207. The library then provides the synchronization token to the requesting director 71–74.

In accordance with an embodiment of the present invention, and referring additionally to FIG. 10, a data storage library 14–15 additionally determines the idle time status of the library, and provides the idle time status to the requesting director, e.g., by attaching the idle time status to the synchronization token.

A library 14–15 receives the request for the synchronization token from a director 71–74 in step 210. In accordance with the incorporated Bish et al. application, in step 211, the library controller 30 accesses the synchronization token 201 for the directly associated data volume and attaches the cache/backing storage flag 67 or 68 which indicates the access level of the data volume as stored in the library, e.g., as flag 207. A "SCRATCH" volume may be given a null token or identified as "SCRATCH".

In accordance with the present invention, the library controller 30 determines the idle time status. In one embodiment, the controller 30, in step 220, determines the percentage of available operating time that the library is idle. For example, if the library is fully idle, the percentage of available operating time that the library is idle is 100%. In one embodiment of the present invention, the percentage of idle time determined in step 220 is the idle time status.

In accordance with an alternative embodiment of the invention, the idle time status is a combination of the percentage of available operating time that the library is idle and the percentage of available operating time that the library is in I/O wait state. Thus, step 221 comprises determining the percentage of available operating time the library is in I/O wait state. In I/O wait state, the library is not at idle, but could do work. As one example of combination of the idle percentage and the I/O wait state percentage, the algorithm determining the current idle time status comprises determining: (100% less the percentage of available operating time the library is idle)+((100% less the percentage of available operating time the library is in I/O wait state)/2), the smaller summed percentage comprising the greater idle time status.

A data storage library may become so overloaded in writing to cache that not all of the input commands can be handled promptly by the library. The cache only becomes available for new writes and updates as other data volumes are migrated from the cache. As is known to those of skill in the art, a library may then issue a delay with respect to each input command from the directors or hosts causing a "write" operation to cache 40. The issuance of delays is called "throttling", and is discussed in U.S. Pat. No. 5,926,834.

At some point, when the cache 40 is full and the library is full of work, the library is "fully throttling". In one embodiment, step 222 determines whether the "fully throttling" stage has been reached. If so, step 223 sets a throttling flag, which may comprise a special idle. status indicator. If not fully throttling, "NO" in step 222, the current idle time status is calculated in step 225 by the library controller 30.

The calculation may be in accordance with the above algorithm, and throttling may be incorporated into the calculation, e.g., by adding to the above determination (150)+((throttling delay time in milliseconds)/2).

Thus, values determined in step 225 in accordance with the exemplary algorithm may comprise (0–100) indicating that the library has idle time, the lower the value the greater the idle time and the greater the idle time status. Values of (100–150) indicate that the library is busy, but the library controller is occupied in an I/O wait state some of the time and may still do work. If throttling, the values are (150–250). As an alternative embodiment to steps 222 and 223, a value of 250 in step 225 may indicate full throttling. Thus, in step 222, if it is known that the library is fully throttling, step 223 may provide the idle time status value of 250.

As discussed above, in one embodiment of the invention, in step 230, the current encoded idle time status 200 of FIG. 8, determined in step 225 or provided in step 223, is attached to the synchronization token 201 directly associated with the requested data volume. Then, in step 231, the library provides the synchronization token, with the current idle time status indicator attached, to the requesting director 71–74.

Those of skill in the art may organize the above steps differently, or may employ a differing, but similar, algorithm to determine the idle time status 200.

Figure 11:
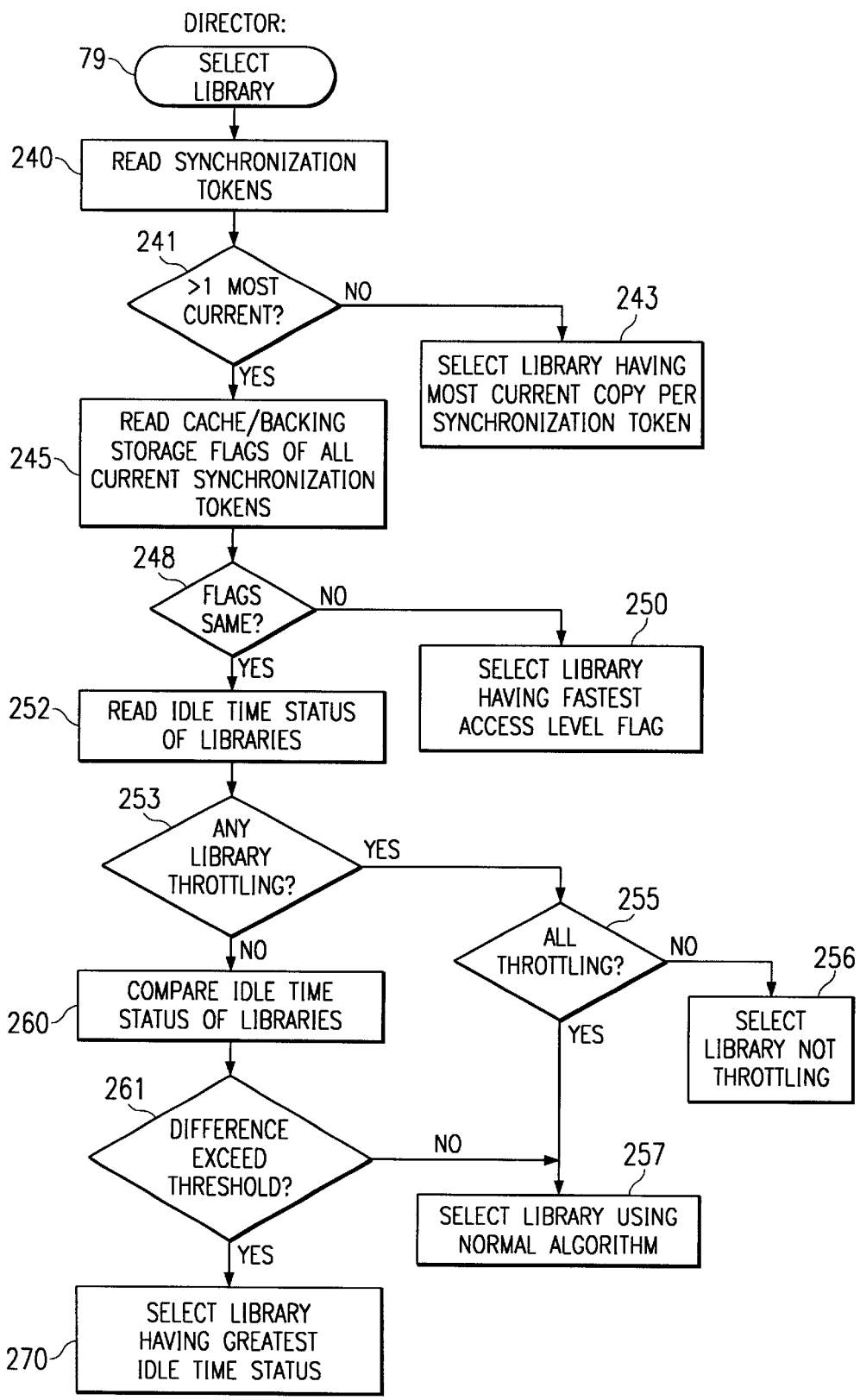
FIG. 11 is a flow chart depicting a method in accordance with an embodiment of the present invention for selecting a data storage library for providing a data volume employed with a director of FIG. 1.

FIG. 11 illustrates one embodiment of the present invention in which the director or host performs step 79 of FIG. 7, selecting a library to access the requested data volume. In step 240, the director 71–74 (or host, as discussed above) reads the synchronization tokens 201 supplied by each of the data storage libraries 14–15 having a copy of the requested data storage volume. As discussed above, the "SCRATCH" volumes either are identified as such or have the synchronization tokens set to a null. Alternatively, the indication that the command is to write will indicate that no synchronization tokens are needed and the libraries will be treated as though the synchronization tokens are at the same most current update level. The director, in step 241, determines from the synchronization token indication of the update level 206 whether more than one library has the most current copy. "SCRATCH" volumes will have identical synchronization tokens, or will be treated as though they are identical. If not, the library having the most current copy is selected in step 243. If more than one library has the most current copy, the director reads the cache/backing storage flags 207 of all the most current synchronization tokens in step 245.

In step 248, the director determines whether all the flags are the same, or that at least two of the flags indicate the fastest access level, indicating that the most current copy of the data volume is stored at the same fastest access level in at least two libraries. As one example, the fastest access level of storage may comprise cache storage as opposed to backing storage. Thus, the data volume may be stored in storage 39 in one library and in storage 40 in another library, but both are considered the fastest access level, as indicated by flags 67 in FIGS. 4A and 4B. The determination may indicate that at least two of the directly associated redundant copies of the data volume stored in the data storage libraries are in cache storage, else none of the copies at the same most recent update level is in cache storage and all are in said backing storage. Alternatively, cache storage 39 may be considered to be a faster access level of storage than cache storage 40, as indicated by flags 68 in FIGS. 6A and 6B. If only one of the most current copies is stored at the fastest access level of storage, the library storing that copy is selected in step 250. As discussed above, the libraries will reserve space at the fastest access level of cache for "SCRATCH" volumes. Thus, either the flags will be the same, indicating the same fastest access level of cache, or the indication that the command is to write will indicate that no flags are needed and the libraries will be treated as though the flags are at the same fastest access level.

Therefore, "SCRATCH" volumes are defined herein as having the same synchronization tokens, indicating the same most current update level, and as having the same flags, indicating the same fastest access level.

If the flags are the same in step 248, at least two most current copies of the data volume are in the fastest access level of storage in the libraries.

In accordance with the present invention, the director reads the idle time status of the libraries providing the synchronization tokens directly associated with the requested data volume in step 252. In step 253, the director determines whether any library is fully throttling. As discussed above, throttling may be determined by a special character or value, or by reaching a maximum value in accordance with an algorithm. Alternatively, step 253 may comprise the detection of any throttling, for example, such as indicated by a value of 150 or better in the above algorithm.

Upon step 253 indicating that at least one of the libraries is throttling, step 255 determines whether all of the libraries are throttling (or fully throttling). If not all libraries are throttling, step 256 selects the library that is not throttling. If all the libraries are throttling, a normal algorithm, such as a round robin algorithm, is employed in step 257 to select the data storage library to access the data volume.

If step 253 indicates that no library is throttling (or fully throttling), the director compares the idle time status 200 of each of the libraries in step 260. In optional step 261, the director determines whether the difference between the idle time status of the libraries exceeds a threshold. As an example and using the above algorithm, the threshold may comprise a value of 25. Thus, if both libraries are at about the same level of activity and have nearly the same idle time status, "NO", the library is selected in step 257 using a normal algorithm.

If, however, the libraries storing the most current copies in the same fastest access level of storage have different workload availabilities such that the idle time status of each is different, or as indicated in step 261, that difference exceeds a threshold, the director selects, in step 270, the library having the greatest idle time status. Thus, the data storage library having the greatest availability is selected.

By selecting the library having the greatest availability in each instance that a data volume is selected, the workload is balanced between the libraries. Thus, the present invention selects the data storage library to access a redundant copy of an identifiable data volume so as to balance the workload between the data storage libraries.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for accessing identifiable data volumes from a plurality of data storage libraries in response to recall requests, said data storage libraries storing and accessing redundant copies of said identifiable data volumes, said data storage libraries having at least two access levels of storage for storing said identifiable data volumes, said access levels comprising differing access speeds to said stored identifiable data volumes, each said data storage library migrating data volumes from faster said access levels of said storage to slower said access levels of said storage, said identifiable data volumes each directly associated with a token, said token providing an indicator of said access level of said identifiable data volume in said data storage library, said recall requests additionally requesting said directly associated tokens, said method comprising the steps of:

each said data storage library providing current idle time status of said library;

in response to said recall request for one of said identifiable data volumes, reading said token directly associated with said data volume from at least two of said plurality of data storage libraries;

determining from said read tokens whether a plurality of said directly associated redundant copies of said data volume are at the same said access level and none of said copies of said data volume is at a faster said access level, such that said copies of said data volume are stored in said data storage libraries at the same fastest available said access level;

upon said determining step indicating that at least two of said directly associated redundant copies of said data volume stored in said data storage libraries are at said same fastest available access level, comparing said provided idle time status of said data storage libraries storing said directly associated redundant copies;

indicating which of said directly associated data storage libraries provided the greater said provided idle time status; and responding to said idle time indicating step, accessing said data volume from said indicated data storage library.

2. The method of claim 1, wherein said indicating step additionally comprises indicating whether the difference between said greater idle time status and said idle time status of the other of said directly associated libraries exceeds a threshold; and wherein said accessing step additionally comprises, upon said idle time status difference failing to exceed said threshold, accessing said data volume from one of said data storage libraries designated in accordance with a normal algorithm.

3. The method of claim 1, wherein said step of said library providing said current idle time status comprises attaching said provided status to said token.

4. The method of claim 3, wherein said step of providing said current idle time status comprises determining the percentage of available operating time said library is idle.

5. The method of claim 4, wherein said step of providing said current idle time status comprises determining the combination of percentage of available operating time said library is idle and the percentage of available operating time said library is in I/O wait state.

6. The method of claim 5, wherein said step of providing said current idle time status comprises determining: (100% less the percentage of available operating time said library is idle)+((100% less the percentage of available operating time said library is in I/O wait state)/2), the smaller summed percentage comprising the greater said idle time status.

7. The method of claim 1, wherein said step of providing said current idle time status additionally comprises determining whether one of said libraries is in a throttling state, throttling its operations, and wherein said indicating step additionally comprises determining whether less than all of said libraries is in said throttling state, and indicating one of said libraries in other than said throttling state.

8. A method for accessing redundant copies of identifiable data volumes from a plurality of data storage libraries in response to recall requests, said redundant copies of identifiable data volumes having update levels; said data storage libraries storing and accessing said redundant copies of said identifiable data volumes, said data storage libraries having differing access levels of storage comprising cache storage and backing storage with differing access speeds, said cache storage faster than said backing storage, each said data storage library migrating data volumes from said faster cache storage to said backing storage; said identifiable data volumes each directly associated with an updatable synchronization token, said synchronization token indicating the relative said update levels of said directly associated redundant copies and providing a storage indicator indicating whether said identifiable data volume is currently stored in said cache storage or said backing storage; said method comprising the steps of:

each said data storage library providing current idle time status of said library;

in response to said recall request for one of said identifiable data volumes, reading said synchronization token directly associated with said data volume from at least two of said plurality of data storage libraries;

determining from said read synchronization tokens whether said directly associated redundant copies of said data volume are at the same most recent said update level, and from said storage indicator whether said copies at said same most recent update level are in said cache storage or are in said backing storage;

upon said determining step indicating that at least two of said directly associated redundant copies of said data volume stored in said data storage libraries are at said same most recent update level and are in said cache storage, else none of said copies at said same most recent update level is in said cache storage and all are in said backing storage, comparing said provided idle time status of said data storage libraries storing said directly associated redundant copies;

indicating which of said directly associated data storage libraries provided the greater said provided idle time status; and responding to said idle time indicating step, accessing said data volume from the one of said indicated data storage library.

9. The method of claim 8, wherein said cache storage additionally comprises a plurality of access levels of said storage, said levels comprising differing access speeds to said stored identifiable data volumes; wherein said determining step additionally determines from said indicator whether said copies at said same most recent update level in said cache storage are at the same said access level of said cache storage and none of copies of said data volume is at a faster said access level; and wherein said comparing step responds to said determining step indicating that at least two of said directly associated redundant copies of said data volume stored in said data cache storage in said data storage libraries are at said same fastest available access level.

10. The method of claim 8, wherein said step of said library providing said current idle time status comprises attaching said provided status to said directly associated synchronization token.

11. A data storage library system coupled to at least one host, for accessing redundant copies of identifiable data volumes in response to recall requests from said hosts, said data storage library system comprising:

a plurality of data storage libraries, each said data storage library having a library controller, and at least two access levels of storing and accessing said identifiable data volumes, said access levels comprising differing access speeds to said stored identifiable data volumes, said library controller additionally providing a token directly associated with each said data volume, said token providing an indicator of said access level of said identifiable data volume in said data storage library, and each said library controller providing current idle time status of said directly associated library; and at least one director coupled to said at least one host and coupled to each said data storage library; said director receiving said recall requests relating to said identifiable data volumes; said director responding to said recall request for one of said identifiable data volumes, reading said token directly associated with said data volume from at least two of said plurality of data storage libraries; said director determining from said read tokens whether a plurality of said directly associated redundant copies of said data volume are at the same said access level and none of said copies of said data volume is at a faster said access level, such that said copies of said data volume are stored in said data storage libraries at the same fastest available said access level; said director, upon said determination indicating that at least two of said directly associated redundant copies of said data volume stored in said data storage libraries are at said same fastest available access level, comparing said provided idle time status of said data storage libraries storing said directly associated redundant copies, and indicating which of said directly associated data storage libraries provided the greater said provided idle time status; said director responding to said idle time indication, accessing said data volume from said indicated data storage library.

12. The data storage library system of claim 11, wherein said director indication of said idle time status additionally comprises indicating whether the difference between said greater idle time status and said idle time status of the other of said directly associated libraries exceeds a threshold; and wherein said director, upon said idle time status difference failing to exceed said threshold, accesses said data volume from one of said data storage libraries designated in accordance with a normal algorithm.

13. The data storage library system of claim 11, wherein said data storage library controllers additionally attach said provided status to said token.

14. The data storage library system of claim 13, wherein said data storage library controllers provide said current idle time status, determining the percentage of available operating time said library is idle.

15. The data storage library system of claim 14, wherein said data storage library controllers provide said current idle time status, determining the combination of percentage of available operating time said library is idle and the percentage of available operating time said library is in I/O wait state.

16. The data storage library system of claim 15, wherein said data storage library controllers provide said current idle time status, determining: (100% less the percentage of available operating time said library is idle)+((100% less the percentage of available operating time said library is in I/O wait state)/2), the smaller summed percentage comprising the greater said idle time status.

17. The data storage library system of claim 11, wherein said data storage library controllers provide said current idle time status, determining whether one of said libraries is in a throttling state, throttling its operations, and wherein said indicating step additionally comprises determining whether less than all of said libraries is in said throttling state, and indicating one of said libraries in other than said throttling state.

18. The data storage library system of claim 11, wherein said redundant copies of identifiable data volumes have update levels; wherein said data storage libraries additionally comprise cache storage and backing storage comprising said at least two access levels of storing and accessing said identifiable data volumes; wherein each said data storage library controller provided token additionally comprises an updatable synchronization token indicating the relative said update level of said directly associated redundant copy of said identifiable data volume, and providing a storage indicator whether said identifiable data volume is currently stored in said cache storage or said backing storage; wherein said director receiving said recall request determines from said read synchronization tokens whether said directly associated redundant copies of said data volume are at the same most recent said update level, and from said storage indicator whether said copies at said same most recent update level are in said cache storage or are in said backing storage; and, upon said token determination indicating that at least two of said directly associated redundant copies of said data volume stored in said data storage libraries are at said same most recent update level and are in said cache storage, else none of said copies at said same most recent update level is in said cache storage and all are in said backing storage, comparing said provided idle time status of said data storage libraries storing said directly associated redundant copies.

19. The data storage library system of claim 18, wherein said data storage library controllers additionally attach said provided status to said token.

20. A computer program product usable with a plurality of programmable computer processors having computer readable program code embodied therein, for accessing identifiable data volumes from a plurality of data storage libraries in response to recall requests, said data storage libraries storing and accessing redundant copies of said identifiable data volumes, said data storage libraries having at least two access levels of storage for said identifiable data volumes, said access levels comprising differing access speeds to said stored identifiable data volumes, each said data storage library migrating data volumes from faster said access levels of said storage to slower said access levels of said storage, said identifiable data volumes each directly associated with a token, said token providing an indicator of said access level of said identifiable data volume in said data storage library, comprising:

computer readable program code which causes said programmable computer processors comprising library controllers in said data storage libraries to provide current idle time status of said library;

computer readable program code which causes each of said plurality of programmable computer processor comprising directors to respond to said recall request for one of said identifiable data volumes, reading said token directly associated with said data volume from at least two of said plurality of data storage libraries;

computer readable program code which causes each said programmable computer processor director to determine from said read tokens whether a plurality of said directly associated redundant copies of said data volume are at the same said access level and none of said copies of said data volume is at a faster said access level, such that said copies of said data volume are stored in said data storage libraries at the same fastest available said access level;

computer readable program code which causes said programmable computer processor director to, upon said determination indicating that at least two of said directly associated redundant copies of said data volume stored in said data storage libraries are at said same fastest available access level, compare said provided idle time status of said data storage libraries storing said directly associated redundant copies;

computer readable program code which causes a said programmable computer processor director to indicate which of said directly associated data storage libraries provided the greater said provided idle time status; and computer readable program code which causes said programmable computer processor director to respond to said indicated greater idle time status, to access said data volume from said indicated data storage library.

21. The computer program product of claim 20, wherein said computer readable program code which causes said programmable computer processor director to indicate said greater idle time status, causes said programmable computer processor director to indicate whether the difference between said greater idle time status and said idle time status of the other of said directly associated libraries exceeds a threshold; and wherein said computer readable program code which causes said programmable computer to access said data volume additionally comprises, upon said idle time status difference failing to exceed said threshold, causes said computer processor director to access said data volume from one of said data storage libraries designated in accordance with a normal algorithm.

22. The computer program product of claim 20, wherein said computer readable program code additionally causes said programmable computer processor library controllers to attach said provided current idle time status to said token.

23. A computer program product usable with a programmable computer processor having computer readable program code embodied therein, said programmable computer processor comprising a library controller for one of a plurality of data storage libraries, for accessing identifiable data volumes from said plurality of data storage libraries in response to access requests from a director; said data storage libraries storing and accessing redundant copies of said identifiable data volumes, said data storage libraries having cache storage and backing storage, each said data storage library migrating data volumes from said cache storage to said backing storage; said identifiable data volumes each directly associated with an updatable synchronization token, said synchronization token indicating the relative said update levels of said directly associated redundant copies and providing a storage indicator indicating whether said identifiable data volume is currently stored in said cache storage or said backing storage; said director access requests based on a determination from said synchronization tokens indicating that at least two of said directly associated redundant copies of said data volume stored in said data storage libraries are at the same most recent update level and are in said cache storage, else none of said copies at said same most recent update level is in said cache storage and all are in said backing storage, and then comparing said idle time status of said data storage libraries storing said directly associated redundant copies, accessing said data volume from said directly associated data storage library providing the greater said provided idle time status, comprising:

computer readable program code which causes said programmable computer processor to determine said current idle time status of said library; and computer readable program code which causes said programmable computer processor to provide said determined current idle time status of said library for said access determination.

24. The computer program product of claim 23, wherein said computer readable program code which causes said computer processor to provide said current idle time status, additionally causes said programmable computer processor to attach an indicator of said provided current idle time status of said library to said synchronization token directly associated with said redundant copy of said data volume.

25. The computer program product of claim 23, wherein said computer readable program code which causes said programmable computer processor to determine said current idle time status, comprises causing said programmable computer processor to determine the percentage of available operating time said library is idle, the smaller percentage comprising the greater said idle time status.

26. The computer program product of claim 25, wherein said computer readable program code which causes said programmable computer processor to determine said current idle time status, comprises causing said programmable computer processor to determine the combination of percentage of available operating time said library is idle and the percentage of available operating time said library is in I/O wait state.

27. The computer program product of claim 26, wherein said computer readable program code which causes said programmable computer processor to determine said current idle time status, comprises causing said programmable computer processor to determine: (100% less the percentage of available operating time said library is idle)+((100% less the percentage of available operating time said library is in I/O wait state)/2), the smaller summed percentage comprising the greater said idle time status.

28. The computer program product of claim 23, wherein said computer readable program code which causes said programmable computer processor to determine said current idle time status, comprises causing said programmable computer processor to determine whether one of said libraries is in a throttling state, throttling its operations, and whereby said director accessing comprises determining whether less than all of said libraries is in said throttling state, and accessing said data volume from the one of said libraries in other than said throttling state.

29. An automated data storage library for accessing identifiable data volumes from a plurality of said data storage libraries in response to access requests from a director; said identifiable data volumes each directly associated with an updatable synchronization token, said synchronization token indicating the relative update levels of said directly associated redundant copies; said director access requests based on a determination from said synchronization tokens indicating that at least two of said directly associated redundant copies of said data volume stored in said data storage libraries are at the same most recent update level and are in cache storage thereof, else none of said copies at said same most recent update level is in said cache storage and all are in backing storage thereof, and then comparing said idle time status of said data storage libraries storing said directly associated redundant copies, and providing an access request for said data volume to said directly associated data storage library providing the greater said provided idle time status, said library comprising:

cache storage storing said identifiable data volumes at a fast access speed;

backing storage storing said identifiable data volumes at an access speed less than that of said cache storage; and a library controller, migrating data volumes from said cache storage to said backing storage; said library controller directly associating an updatable synchronization token with each said data volume, said synchronization token indicating the relative said update levels of said directly associated redundant copies and providing a storage indicator indicating whether said identifiable data volume is currently stored in said cache storage or said backing storage; said library controller determining the current idle time status of said library; said library controller providing said determined current idle time status of said library for said access determination whereby said access request is directed to the one of said libraries storing said data volume at the same most current said update level and the same fastest said access speed, and which has the greatest said current idle time status; and said library controller accessing said data volume in response to said access request.

30. The automated data storage library of claim 29, wherein said library controller provision of said current idle time status, additionally comprises attaching an indicator of said provided current idle time status of said library to said synchronization token directly associated with said redundant copy of said data volume.

31. The automated data storage library of claim 29, wherein said library controller determination of said current idle time status, comprises determining the percentage of available operating time said library is idle, the smaller percentage comprising the greater said idle time status.

32. The automated data storage library of claim 31, wherein said library controller determination of said current idle time status, comprises determining the combination of percentage of available operating time said library is idle and the percentage of available operating time said library is in I/O wait state.

33. The automated data storage library of claim 32, wherein said library controller determination of said provided current idle time status, comprises determining: (100% less the percentage of available operating time said library is idle)+((100% less the percentage of available operating time said library is in I/O wait state)/2), the smaller summed percentage comprising the greater said idle time status.

34. The automated data storage library of claim 29, wherein said library controller determination of said provided current idle time status, comprises determining whether one of said libraries is in a throttling state, throttling its operations, whereby said access request is based on determining whether less than all of said libraries is in said throttling state, and providing said access request to said data storage library in other than said throttling state.

* * * * *